United States Patent
Wuthrich

[11] 3,899,700
[45] Aug. 12, 1975

[54] INDEXING MECHANISM FOR ELECTRIC WATCH

[75] Inventor: Paul Wuthrich, Watertown, Conn.

[73] Assignee: Timex Corporation, Waterbury, Conn.

[22] Filed: Sept. 3, 1974

[21] Appl. No.: 503,142

[52] U.S. Cl. ............... 310/37; 58/28 A; 58/28 D; 58/117
[51] Int. Cl.² ............................................ H02K 33/00
[58] Field of Search ......... 58/23, 23 D, 23 V, 28 R, 58/28 A, 28 B, 28 D, 116 R, 116 M, 117; 310/36–39, 156; 318/128–132; 74/1.5

[56] References Cited
UNITED STATES PATENTS

| | | | |
|---|---|---|---|
| 2,971,324 | 2/1961 | Beyner | 58/28 D |
| 2,981,117 | 4/1961 | Studer | 58/28 D |
| 3,248,623 | 4/1966 | Faure | 310/37 X |
| 3,351,788 | 11/1967 | Faure | 310/37 X |
| 3,691,754 | 9/1972 | Hetzel | 310/37 X |
| 3,708,974 | 1/1973 | Fujimori | 58/28 R |

Primary Examiner—Donovan F. Duggan

[57] ABSTRACT

An indexing mechanism for transforming oscillatory motion produced by a motor in an electronic or electric watch to unidirectional rotation of the index wheel. The indexing mechanism includes two magnetized members, each separately rotatable about a common axis and each carrying one of the index pins, a stationary coil for causing the two members to rotate together during the drive phase, and means biasing the members in opposite rotational directions during the rest phase, so that the index wheel is always locked in position.

5 Claims, 3 Drawing Figures 3,899,700

INDEXING MECHANISM FOR ELECTRIC WATCH

BACKGROUND OF THE INVENTION

This invention relates generally to indexing mechanisms for horological devices, and more particularly to an improved indexing mechanism suitable for directly driving the hands of a watch from an alternately pulsed electric coil.

Indexing mechanisms are known in the art for converting periodically applied electrical pulses of alternating polarity to a coil to create oscillatory motion, and driving an index wheel through pins attached to the oscillating member. An example of the foregoing with a fixed coil and oscillatory magnetized members is seen in U.S. Pat. No. 3,435,311—Matsuzawa et al issued March, 1969; or with fixed magnets and an oscillatory coil as seen in U.S. Pat. No. 3,604,201—Dome issued September, 1971. U.S. Pat. No. 3,775,968 issued December, 1973 to Tuetey shows a loose pallet or pin pair of wire construction with limited movement of the wire in slots of the pallet lever.

In the foregoing arrangements, the index pins are mounted on to a common oscillatory member so that one pin is free while the other is engaged. The foregoing arrangements present problems during the momentary time period during indexing when the index wheel is released from one pin before the other pin is engaged, where there is a possibility of reverse torque on the index wheel. It is also desirable to hold the index wheel firmly locked in position during the rest period of the motor when no pulse is applied.

Accordingly, one object of the present invention is to provide an improved indexing mechanism for converting oscillatory motion by a motor to unidirectional motion of an index wheel, with improved means for locking the index wheel in place between steps.

Another object of the invention is to provide an improved indexing mechanism, wherein the index wheel is held in position by both index pins against undesired reverse motion during rest periods and during the indexing step.

SUMMARY OF THE INVENTION

Briefly stated, the invention is practiced by providing first and second indexing members rotatable about a common axis by electromagnetic motor means, each of the indexing members having a separate indexing pin, means for providing limited lost motion between the two indexing members, and means biasing both of the indexing members in opposite rotatable directions toward the indexing wheel.

DRAWING

These and further objects of the invention will be more clearly understood by reference to the following description, taken in connection with the accompanying drawing, in which:

FIG. 1 is a developed elevation view of an indexing mechanism in accordance with the present invention, FIG. 2 is a plan view of a portion of the index mechanism, taken along lines 2—2, and FIG. 3 is a plan view of a slightly modified and simplified version of the indexing mechanism, intended to illustrate the principle of operation.

DESCRIPTION OF THE PREFERRED EMBODIMENT

Figure 1:
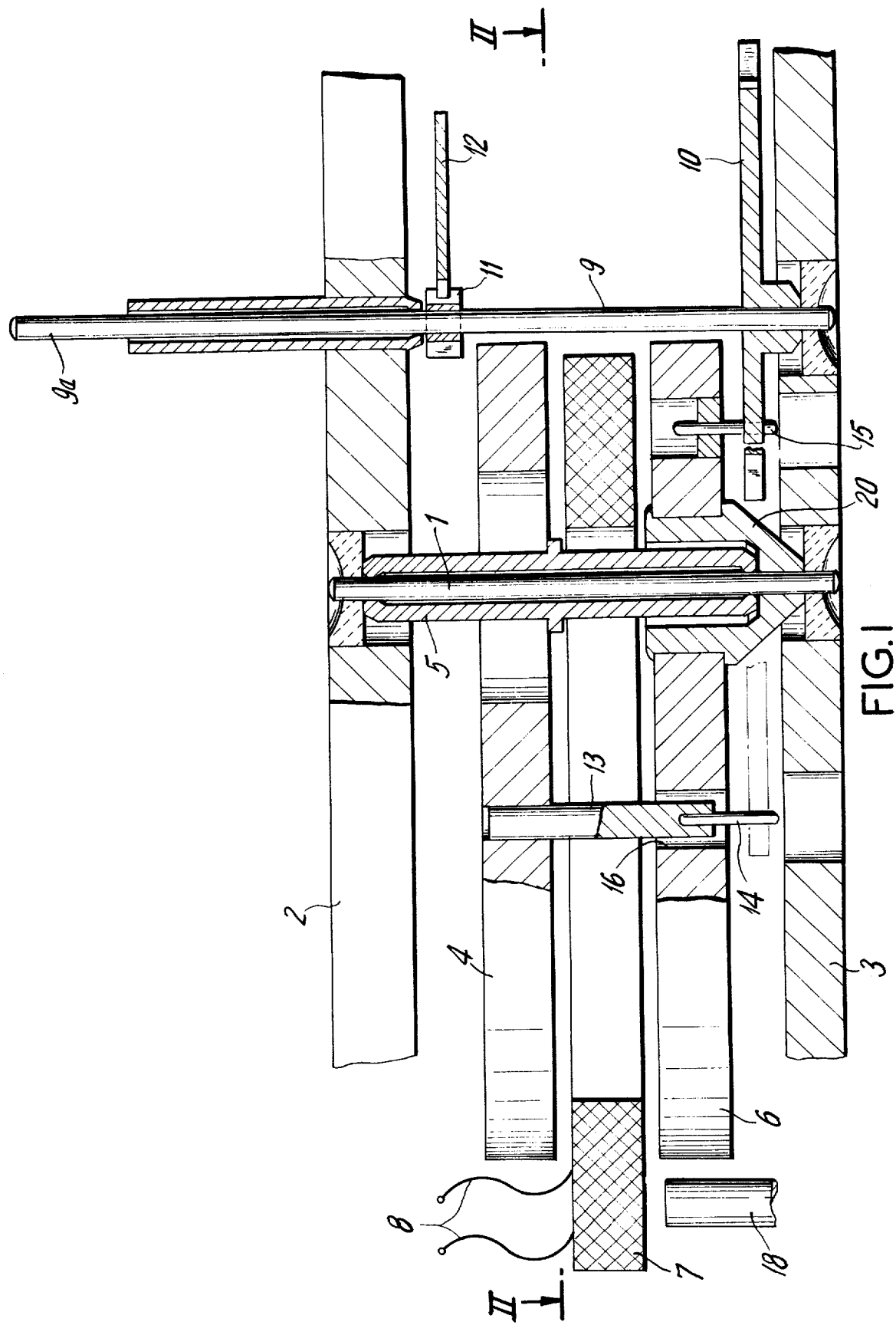

Referring now to FIG. 1 of the drawing, the developed elevation view shows an arbor 1 mounted between fixed frame members 2, 3 of a watch, the arbor serving as a common axis for a first rotatable indexing member 4 mounted on bushing 5 and a second rotatable member 6 coaxially mounted on bushing 20. Members 4, 6 are permanently magnetized in a manner well known in the art to cooperate with a fixed electrical coil 7 provided with precisely timed periodic pulses of alternating polarity via leads 8. The means to provide the pulses of alternating polarity are not shown, but may be furnished from a quartz crystal oscillating time base, a dividing circuit to count the pulses down to a low frequency, and a driver circuit to provide driving pulses to coil 7, one example of such conventional arrangement being shown in U.S. Pat. No. 3,766,729—Diersbock issued October, 1973 and assigned to the present assignee.

Also supported between frame members 2, 3 is a staff 9 carrying a toothed index wheel 10 and having a projecting shaft portion 9a adapted to carry a sweep second hand (not shown). Staff 9 is provided also with a pinion gear 11 engaged with gear 12 representative of a conventional reducing gear chain adapted to drive the other hands of the watch.

The first rotatable member 4 carries a projecting index pin support member 13 with index pin 14 positioned to alternately engage the teeth of the index wheel 10. Similarly, the second rotatable member 6 carries an index pin 15.

In accordance with the present invention, means for allowing limited "lost motion" or relative rotation between the first and second rotatable members 4, 6 is provided by means of a aperture 16 in the form of a hole or slot in the second rotatable member through which the index support 13 extends from the first rotatable member.

Figure 2:
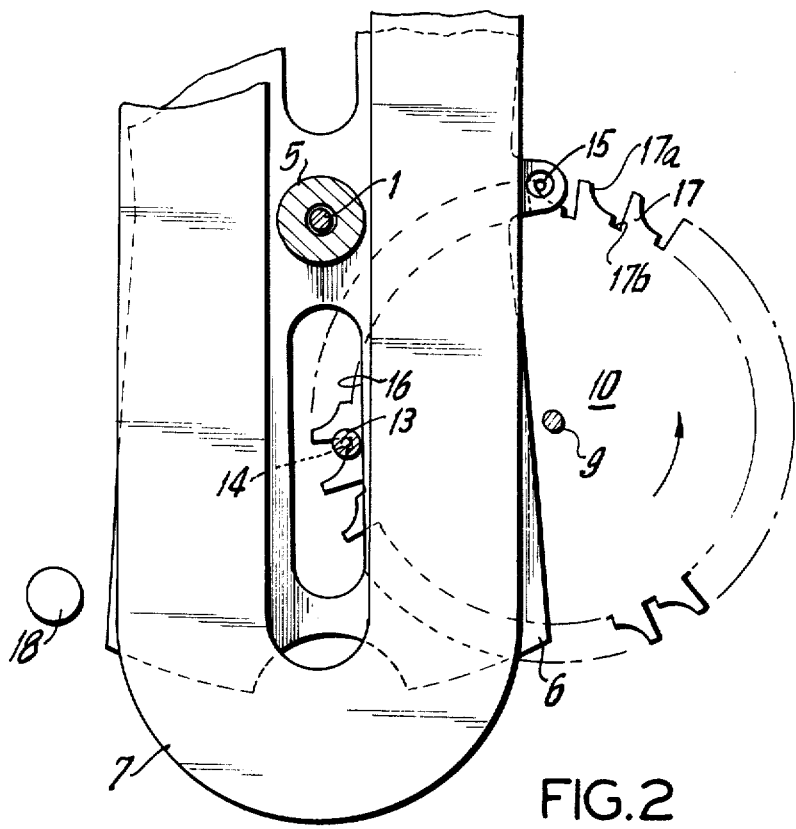

Referring to FIG. 2 of the drawing, the index wheel 10 includes teeth 17 with arcuate driving flanks 17a and inner locking slots 17b. The second rotatable member 6 is shown with its indexing pin 15 resting against the flank 17a during the rest period when no pulse is applied. It is biased into this position by a suitably located ferro magnetic metal member or magnet 18, which may be a special magnet, or in some cases a strategically located metallic part of the watch. Member 18 serves to bias the second rotatable member 6 in a clockwise direction, i.e., the index pin 15 is biased towards the center of index wheel 10. The first rotatable member 4, also has metal or biasing magnets associated with it (not shown), arranged to bias the top rotatable member in a counterclockwise direction, i.e, so that its index pin 14 is also biased toward the center of index wheel 10.

Figure 3:
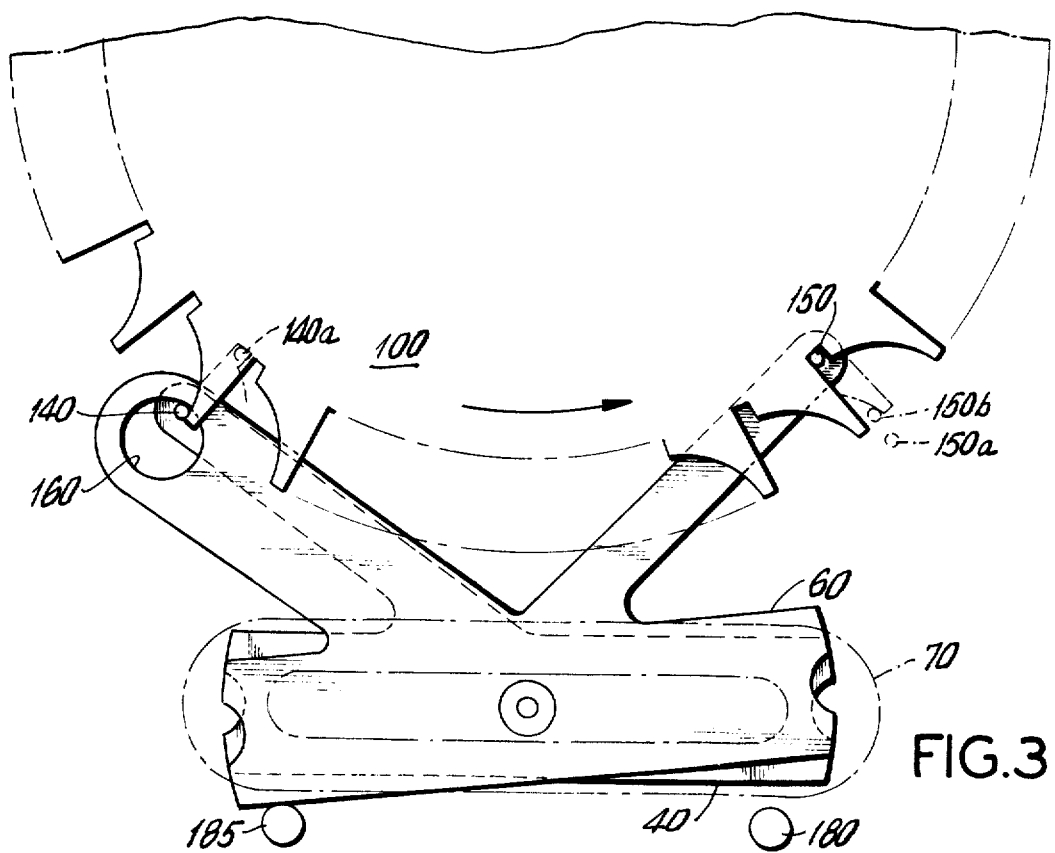

Although the foregoing arrangement of parts is more practical for a watch, due to its compact form, a slightly modified form is illustrated in FIG. 3 primarily for the purpose of explaining its operation. The reference numerals correspond to equivalent functional parts in FIGS. 1 and 2, except that an additional zero has been added to differentiate the parts. A first rotatable member 40 has an index pin 140, while a second rotatable member 60 has an index pin 150. A hole 160 provides "lost motion" to take place between the two rotatable members. The index mechanism is shown in its "rest" position with no magnetomotive force applied by coil 70. In this position, a magnet or metallic member 180 disposed in the plane of rotatable member 40 exerts an attraction which biases member 40 in a clockwise direction so that index pin 140 is on the flank of the index wheel tooth. Similarly, a second magnet or metallic member 185 biases member 60 in a counterclockwise direction so that index pin 150 is locked in the notch between index teeth. When an impulse is received by coil 70, both members 40, 60 are rotated together clockwise so that index wheel 100 is moved by the action of pin 140 in the direction shown by the arrow. At the end of the impulse stroke, pin 140 is locked in position 140a, while pin 150 has moved to 150a. At the end of the electrical pulse to coil 70, the biasing pin 185 tends to rotate member 60 back counterclockwise until the index pin 150 engages the new position of the flank of the tooth, as indicated at 150b.

When the next pulse of opposite polarity is received, pin 150 indexes the index wheel and pin 140 again assumes the locking position at rest as shown in FIG. 3 due to the biasing action of member 180. The foregoing sequence takes place repetitively with the relative movement between members 40, 60 being permitted by the hole 160 providing limited lost motion.

Thus there has been provided an improved indexing mechanism with little likelihood of reverse movement of the indexing wheel taking place during the rest period when no pulse is applied. When one pin is freed to allow indexing, the other pin is already engaged with the flank of the tooth and ready to start the next step of the index wheel.

While the invention has been shown in its preferred embodiment with rotatable members permanently magnetized and cooperating with a fixed electrical coil, it would be within the purview of the present invention to reverse the roles of magnets and coil so that the coils are on the rotatable members and cooperating with a fixed permanent magnet system.

While there has been described what is considered to be the preferred embodiment of the invention, other modifications will occur to those skilled in the art, and it is desired to secure in the appended claims all such modifications as fall within the true spirit and scope of the invention.

I claim:

1. An improved indexing mechanism for transforming oscillatory motion by electromagnetic motor means to unidirectional rotation of a toothed index wheel, wherein the improvement comprises:

first and second rotatable indexing members mounted on a common axis, each of said members having an index pin and adapted to be rotated together in the same direction by said motor means when it is active, means providing limited relative rotation between said first and second members, and means biasing said first and second members in opposite rotational directions such that their index pins are biased toward the index wheel when the motor means is inactive.

2. The combination according to claim 1, wherein said first and second members each include permanent magnet portions cooperating with a fixed coil, said coil supplied with alternating polarity pulses to serve as said motor means.

3. The combination according to claim 2, wherein said biasing means comprise first and second ferro magnetic metallic members disposed in the rotational plane of said first and second rotatable members respectively so that said permanent magnet portion exert magnetic biasing forces on the first and second members in opposite rotational directions.

4. The combination according to claim 1, wherein said means providing limited relative rotation comprises a hole in one of the rotatable members and a projection extending therethrough attached to the other of said rotatable members.

5. The combination according to claim 1, wherein said first rotatable member includes a first magnetized motor portion, a second portion with an index pin, and a third portion defining an aperture, and wherein said second rotatable member includes a first magnetized motor portion and a second portion with an index pin, and means projecting through said aperture of the first rotatable member to allow limited relative rotational movement between the first and second members.

* * * * *